(12) United States Patent
Burse

(10) Patent No.: US 9,723,886 B2
(45) Date of Patent: Aug. 8, 2017

(54) HELMET MIRROR

(71) Applicant: Robert Burse, North Port, FL (US)

(72) Inventor: Robert Burse, North Port, FL (US)

(*) Notice: Subject to any disclaimer, the term of this patent is extended or adjusted under 35 U.S.C. 154(b) by 0 days.

(21) Appl. No.: 14/483,355

(22) Filed: Sep. 11, 2014

(65) Prior Publication Data

US 2015/0138660 A1   May 21, 2015

Related U.S. Application Data

(60) Provisional application No. 61/876,520, filed on Sep. 11, 2013.

(51) Int. Cl.
*A42B 3/04* (2006.01)
*G02B 7/182* (2006.01)
*G02B 1/14* (2015.01)
*G02B 27/01* (2006.01)

(52) U.S. Cl.
CPC ............. *A42B 3/0426* (2013.01); *G02B 1/14* (2015.01); *G02B 27/0176* (2013.01); *G02B 7/1825* (2013.01)

(58) Field of Classification Search
CPC ...... G02B 1/14; G02B 7/1824; G02B 7/1825; A42B 3/0426
USPC .... 359/872, 879, 880; 2/205, 410, 909, 422, 2/DIG. 8
See application file for complete search history.

(56) References Cited

U.S. PATENT DOCUMENTS

| | | | | |
|---|---|---|---|---|
| 3,295,914 A | * | 1/1967 | Dietrich | B60R 1/003 359/881 |
| 4,349,246 A | * | 9/1982 | Binner | A42B 3/0426 24/3.3 |
| 4,490,012 A | * | 12/1984 | Magiske | A42B 1/24 248/466 |
| D284,462 S | | 7/1986 | Greenlaw | |
| 5,076,701 A | * | 12/1991 | Greenlaw | A42B 3/0426 359/871 |
| D378,159 S | * | 2/1997 | Mulkey | D12/189 |
| D389,605 S | | 1/1998 | Berke | |
| 5,917,667 A | * | 6/1999 | Turner | A42B 3/0426 2/209.14 |
| 6,220,717 B1 | * | 4/2001 | Pastore | A45D 42/16 248/466 |
| 7,240,370 B2 | * | 7/2007 | Lerner | G02C 3/02 2/10 |
| 8,156,575 B2 | | 4/2012 | Tronvig | |

(Continued)

*Primary Examiner* — Ricky D Shafer
(74) *Attorney, Agent, or Firm* — Global Intellectual Property Agency, LLC; Daniel Boudwin

(57) ABSTRACT

The present invention is an improved rear view mirror that removably attaches to a protective helmet. The helmet mirror, in its preferred embodiment, includes a bracket, an elongated adjustable arm, an adjustment nut, and a mirror, wherein the bracket and the adjustable arm are rubber-coated. The adjustable arm includes a first end and a second end, wherein the first end is attached to the bracket and the second end is attached to the mirror by means of the adjustment nut. The positioning of the mirror may be adjusted by bending the adjustable arm and/or pivoting the mirror about the adjustment nut. The bracket is bent to form a general J-shape when viewed from the side. The bracket is adapted to be wedged under the rim portion of a protective helmet to removably secure the device to the same.

9 Claims, 3 Drawing Sheets

(56) References Cited

U.S. PATENT DOCUMENTS

| | | | |
|---|---|---|---|
| 8,157,394 B1* | 4/2012 | Downing | G02B 5/08 |
| | | | 248/476 |
| 2006/0026741 A1* | 2/2006 | Lang-Ree | A42B 3/227 |
| | | | 2/410 |
| 2010/0123961 A1* | 5/2010 | Bauer, Jr. | A42B 3/0426 |
| | | | 359/880 |
| 2011/0051273 A1* | 3/2011 | Tronvig | A61F 9/029 |
| | | | 359/876 |
| 2012/0314317 A1 | 12/2012 | Anderson | |
| 2013/0148220 A1* | 6/2013 | Garrels | A42B 3/0426 |
| | | | 359/880 |

* cited by examiner

HELMET MIRROR

CROSS REFERENCE TO RELATED APPLICATION

This application claims the benefit of U.S. Provisional Application No. 61/876,520 filed on Sep. 11, 2013. The above identified patent application is herein incorporated by reference in its entirety to provide continuity of disclosure.

BACKGROUND OF THE INVENTION

Field of the Invention

The present invention relates to a safety gear that can be used with a protective helmet. More specifically, the present invention pertains to an improved rear view mirror attachment for protective helmets. The helmet mirror is designed to securely fasten to the helmet so that it does not to move, rattle or fall off while in use.

There are many great reasons to ride a bicycle; it is a healthy and fun exercise, while also being an environmentally friendly means to commute. However, a bicycle safety is more than just riding with a helmet. There are certain practices that promote a safe environment and prevent injury to bicyclists and others. These safety procedures are often geared towards both bicyclists and vehicle drivers that share the road. Bicyclists need to ride in a predictable manner and take important steps to ensure their own safety as well as others.

One compulsory skill among bicyclists is to be constantly vigilant of his or her own surroundings. For example, one such learnt skill is the ability to see traffic approaching from behind, while keeping one's eyes forward, which is a significant safety measure. Just like driving a vehicle, peripheral vision and awareness are key safety measures while operating a bicycle. However, frequently glancing behind removes one's eyes temporarily from the road directly in front. Especially with someone who is not comfortable with taking backward glances, such an act can easily lead to accidents and collisions.

Additionally, looking to the rear for incoming traffic can cause a rider to swerve and cause an accident. The rider may miss a patch of uneven pavement or a pothole up ahead while taking backward glances, which may also be a potential hazard. A mirror, then, can be an essential piece of equipment for anyone traveling by bike.

The present invention provides a rear view mirror attachment that can be used with an existing protective helmet. In a preferred embodiment, the present invention comprises an adjustable arm having a bracket and a mirror attached thereto, wherein the mirror is attached to the arm via an adjustment nut. The bracket and adjustable arm are rubber-coated and are composed of bendable metal. The adjustable arm can be bent to align the mirror into the desired position. Further, the adjustment nut is used to change and lock the mirror at the desired angle. In some embodiments, the mirror comprises a decorative backing. In operation, the bracket is adapted to removably attach to the rim of a standard bicycle helmet at the front portion thereof, near the wearer's eyes. Accordingly, the adjustable arm can extend outward from the helmet, so as to support the mirror in front of the user. In this way, the present invention increases peripheral vision for a bicyclist.

Description of the Prior Art

Devices have been disclosed in the prior art that relate to rear view mirrors attachable to a helmet. These include devices that have been patented and published in patent application publications. Some of these devices disclose structures that secure to the curved exterior surface of a protective headgear. Other devices disclose clamps that secure a rear view mirror to a helmet. These devices, however, do not disclose a rubber-coated bracket that removably secures to the bottom foam shell of a standard bicycle helmet. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 5,076,701 to Greenlaw discloses a rear view mirror for securement to a protective headgear. The Greenlaw device includes an extension bar having a holder for a rear view mirror mounted on one end of the bar. An adjustable connection is provided between the extension bar and the mirror, which includes a ball formed on a first end and a receptacle formed on the peripheral edge of the mirror holder. A second end of the extension bar is a flat malleable plastic fan-like structure, which can be secured to the protective headgear via adhesives.

The present invention is structurally different than the foregoing Greenlaw device in that the present invention can be removably attached to an existing protective helmet without the use of adhesives. The present invention has a rubber-coated bracket that secures to the bottom foam shell of a standard bicycle helmet. In addition, the adjustable arm is bendable so that the mirror can be moved closer or away from the helmet. The mirror can be further adjusted via an adjustment nut, which allows the mirror to pivot horizontally, thereby securing the mirror at a desired angle. On the other hand, the Greenlaw device comprises a fan-like structure that adheres to the curve of the exterior of a helmet. Greenlaw also discloses a ball connection rather than an adjustment nut.

U.S. Pat. No. 8,156,575 to Tronvig focuses on headwear with rear viewing capability which includes: a recess; a base rigidly coupled to the helmet structure; and a mirror coupled to the base. The mirror is movable between a deployed configuration and a stored configuration in which the mirror is proximate the size of the recess. Similarly, U.S. Published Patent Application Number 2006/0026741 by Lang-Ree generally relates to a system for accommodating helmet accessories. One embodiment has a mirror attachment for a helmet. The helmet has a visor that defines a recess. The mirror attachment includes a base operable to be nested substantially within the recess of the base and coupled to the visor. The mirror is operable to move between a retracted configuration and an extended configuration.

The foregoing devices relate to a headwear with a recess having a mirror. Thus, Tronvig and Lang-Ree are limited in the fact that the mirror is integrally formed within the recess. In contrast, the present invention comprises a mirror that is held away from the protective helmet on which it is mounted, wherein the mirror is mounted via a bracket that can be secured to the bottom foam shell of the helmet. Thereafter, the location of the mirror can be adjusted by means of an adjustable arm, which can be bent in any direction.

U.S. Pat. No. 4,349,246 to Binner is a rear view mirror with slit clip attachment. In one embodiment, the rear view mirror is attached to a helmet by a pair of arms that include a ball-and-socket joint. Unlike the present invention, however, Binner does not disclose a bracket that attaches to a helmet. The present device uses a bracket to attach to the bottom foam shell of a helmet. The present device also comprises a bendable arm and an adjustment nut to secure the mirror in a desired position. The arm and the adjustable nut allow for a greater range of maneuverability compared to the rigid ball-and-socket in the joint of the Binner device.

U.S. Design Pat. No. D284462 to Greenlaw discloses a rear view mirror for attachment to a crash helmet. The attachment includes a proximal end that includes a clamp, and a distal end that includes a mirror. The clamp engages a portion of the helmet and secures thereto. Additionally, U.S. Design Pat. No. D389605 to Berke discloses a helmet with two optical elements affixed to the left and right curves of the helmet. These devices, however, do not disclose a bracket that attaches to the bottom foam shell of the helmet, the bendable arm that positions the mirror, and the adjustment nut that adjusts the angle of the mirror.

Finally, U.S. Published Patent Application Number 2012/0314317 to Anderson is related to a headgear accessory attachment system with a rear view mirror. The system includes a flexible, resilient halo band that is attachable to the sides of the headgear and that extends radially around the front of the headgear across the field of view. The rear view mirror is attached to the halo band and slides along the halo band to the desired orientation. The purpose and design of the present invention differs from the device of Anderson in that the present invention does not comprise a halo band. Instead, the current device comprises a bracket that can secure to the bottom foam shell of the helmet. Additionally, the present invention comprises an adjustable arm that can be bent into the desired orientation, and an adjustment nut that secures the rear view mirror at a desired angle.

The devices disclosed in the prior art have several known drawbacks. These devices generally comprise a mirror is integrally formed with the helmet, such that the mirror can be used with a specific type of a helmet. Additionally, the prior art devices include a mirror that is limited in its range of movement. The present invention overcomes these limitations by disclosing a helmet mirror having a bracket that securely and removably attaches to the foam under-shell of a helmet, such that the mirror does not extensively rattle or shake during use. In this way, the images reflected in the mirror are not distorted. Additionally, the mirror can be adjusted in any direction and in any angle via an adjustable arm and an adjustment nut. It is therefore submitted that the present invention is substantially divergent in design elements from the prior art, and consequently it is clear that there is a need in the art for an improvement to existing options for helmet mirrors for cyclists. In this regard, the instant invention substantially fulfills these needs.

SUMMARY OF THE INVENTION

In view of the foregoing disadvantages inherent in the known types of rear view mirror attachments now present in the prior art, the present invention provides a new and improved helmet mirror wherein the same can be utilized for viewing traffic in the rear without hampering vibrations that may rattle or jar the rear view mirror out of a desirable position.

It is therefore an object of the invention to provide a new and improved helmet mirror that has all of the advantages of the prior art and none of the disadvantages.

Another object of the present invention is to provide a new and improved helmet mirror that can be removably attached to various types of protective helmets and safety helmets.

Yet another object of the present invention is to provide a new and improved helmet mirror that comprises an adjustable arm that is attached to a bracket and a mirror, wherein the bracket is adapted to removably attach to a protective helmet.

Still yet another object of the present invention is to provide a new and improved helmet mirror that comprises an adjustable arm to adjust the location of the mirror and an adjustment nut to adjust the angle of the mirror.

Still yet another object of the present invention is to provide a new and improved helmet mirror that allows a user to see traffic approaching from behind, while keeping his or her eyes forward.

Still yet another object of the present invention is to provide a new and improved helmet mirror that will dampen vibrations that may rattle and jar loose the rear view mirror, and distort vision.

Still yet another object of the present invention is to provide a new and improved helmet mirror wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
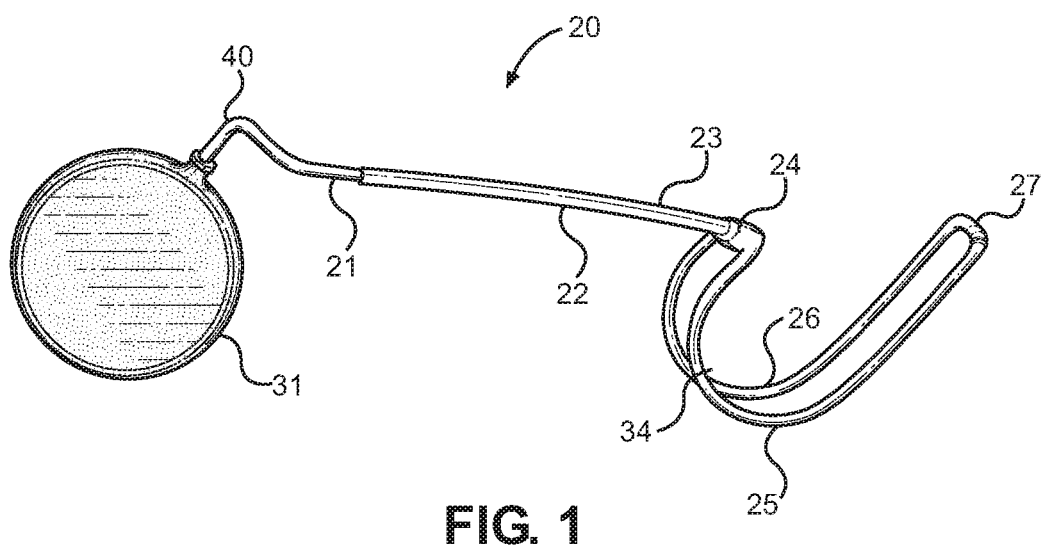
FIG. 1 shows a top perspective of the preferred embodiment of the present invention.

References are made herein to the attached drawings. Like reference numerals are used throughout the drawings to depict like or similar elements of the helmet mirror. For the purposes of presenting a brief and clear description of the present invention, the preferred embodiment will be discussed as attached a standard bicycle helmet while riding any conventional bicycle. The figures are intended for representative purposes only and should not be considered to be limiting in any respect.

Referring now to FIG. 1, there is shown a perspective view of the preferred embodiment of the helmet mirror 20 of the present invention. In the illustrated embodiment, the helmet mirror 20 is adapted to fit a standard bicycle helmet on the bottom rim of the helmet. The helmet mirror 20 comprises an adjustable arm 21 that is attached to a bracket 34. The adjustable arm 21 and the bracket 34 are composed of flexible metal. In one embodiment, the adjustable arm 21 and the bracket 34 are composed of metal, or other suitable material that is used to manufacture a bicycle spoke. Additionally, the exterior of each of the arm 21 and the bracket 34 comprises a layer of a rubber-coating 22. The rubber-coating 22 provides a high friction surface so that the adjustable arm 21 and the bracket are prevented from shifting or sliding easily when the bracket is removably attached to a helmet.

The adjustable arm has two terminal ends: a first end 23 attached to the bracket 34 that attaches to a helmet; and a second end 40 attached to a mirror backing 31. The first end 23 comprises a connecting point 24 that joins the adjustable arm 21 to the bracket 34. In the illustrated preferred embodiment, the adjustable arm 21 and the bracket 34 are unitary in structure. Thus, the connecting point 24 does not contain an additional fastener, but rather is a point where the adjustable arm 21 stems from the bracket 34 at an angle. In other embodiments, the connecting point 24 may contain a fastener or a similar mechanism such as press fit that is adapted to join the adjustable arm 21 with the bracket 34.

The bracket 34 is an enclosed and elongated loop that substantially curved at midpoints 25, 26, defining a first section that extends between the connecting point 24 and the midpoints 25, 26, and a second section that extends between the midpoints 25, 26 and a terminal end 27. The first section is shorter than the second section to increase support to the mirror disposed on the adjustable arm. When viewed from the side, the bracket 34 substantially comprises a J-shape, so that it follows the curvature of a rim of a protective helmet. Additionally, the distance the two midpoints 25, 26 define the width of the bracket 34. The bracket 34 is configured so that the width of the bracket 34 is sufficiently wide to prevent the bracket 34 from tilting to one side. In the illustrated embodiment, the bracket 34 and the adjustable arm 21 are unitary in structure so that the device is continuous from the adjustable arm 21 to the enclosed loop that makes up the bracket 34.

The bracket 34 is adapted to fit snugly on the rim of a protective helmet so that the connecting point 24 is at the outer surface of the rim and the terminal end 27 is at the inner surface of the rim. The first section of the bracket 34 affixes to the exterior bottom rim of a protective helmet, while the second section of the bracket 34 is secured to the interior rim of the protective helmet.

The second end 40 of the adjustable arm 21 comprises a mirror attached thereto. The mirror comprises a backing 31 that is composed of metal, which may comprise a printed or an etched design thereon, depending upon embodiment. The backing 31 may comprise a recessed portion defined by a flange around the perimeter thereof. The recessed portion is adapted to receive the mirror therein so that the mirror fits snugly in the recessed portion and the surface of the mirror is substantially level with the flange. The mirror may be circular, as illustrated, or comprise other shapes. The location of the mirror can be adjusted by bending the adjustable arm 21 side-to-side or up-and-down. Thereafter, the angle of the mirror can be adjusted by pivoting the mirror about the second end 40 of adjustable arm 21.

Figure 2:
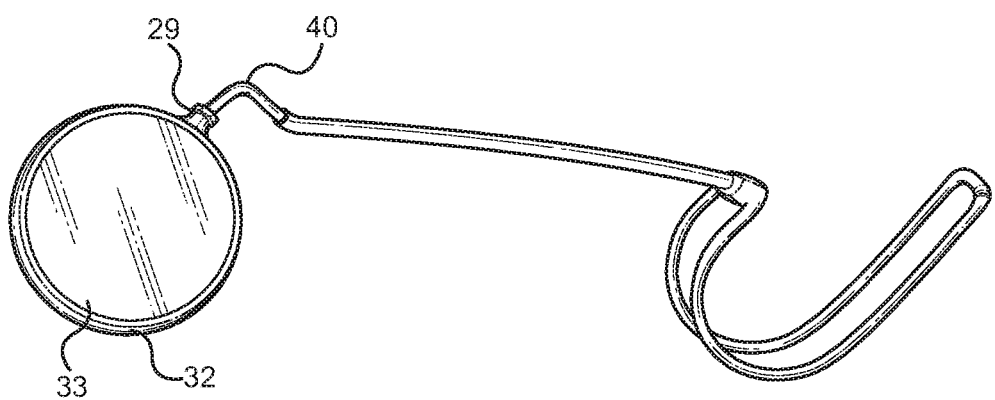
FIG. 2 shows a bottom perspective of the preferred embodiment of the present invention with the mirror in view.
Figure 4:
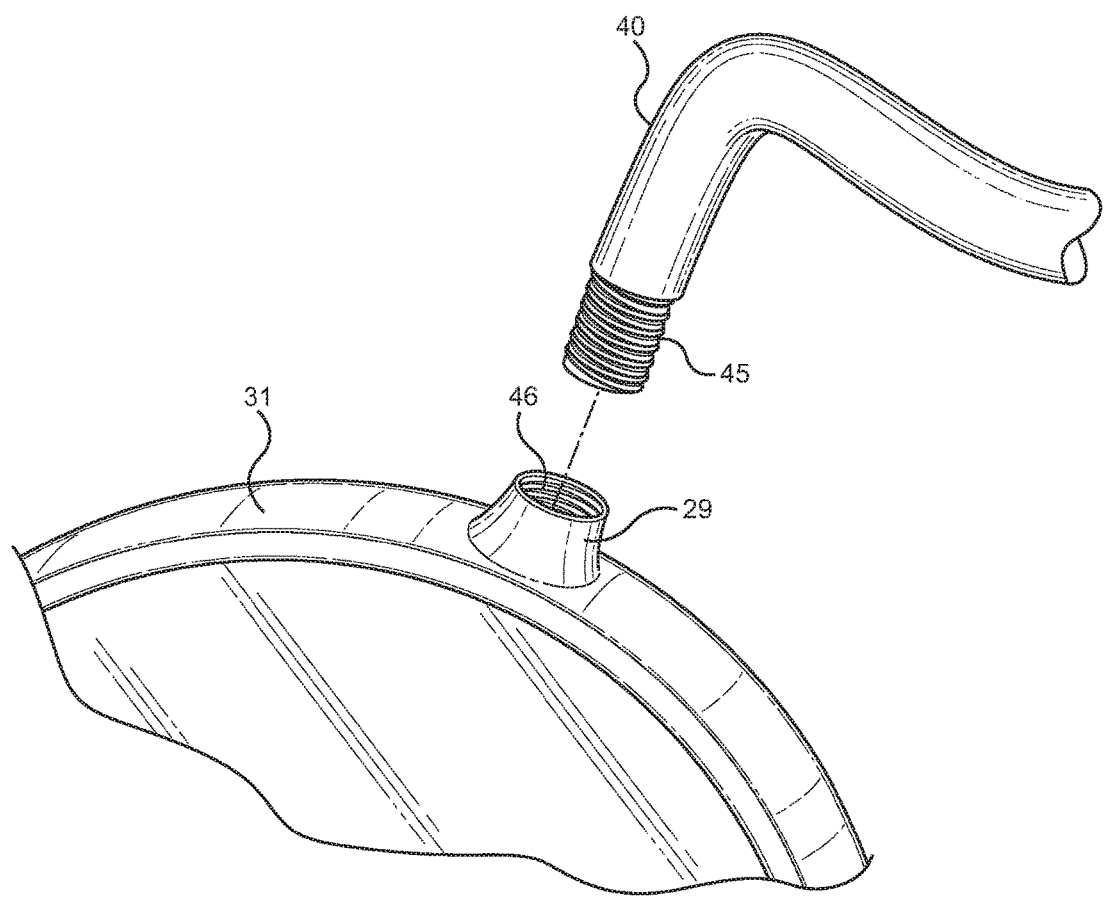
FIG. 4 shows a close up perspective view of the adjustment nut of the present invention with a threaded coupling.

Referring now to FIGS. 2 and 4, there is shown another perspective view of the helmet mirror 20 with the mirror 33 in view, and a close up perspective view of the adjustment nut with a threaded coupling, respectively. The mirror 33, in the preferred embodiment, is circular. The glass that is used to make mirror 33 is resilient and can be made of any material that is likewise resilient, shatterproof or scratchproof. The mirror 33 is attached to the backing 31 via strong adhesives, or via other suitable fastening means. Thereafter, a protective coating 32 is applied to the mirror 33 and the flange of the backing 31. The proactive coating 32 is transparent or clear so that the mirror can be used in a usual manner without any discoloration thereof. The protective coating 32 prevents the moisture and other elements from seeping between the periphery of the mirror 33 and the flange of the backing 31. In this way, the protective coating 32 can prevent the mirror 33 from separating from the backing 31 and discoloration or distortion.

The mirror 33 can be adjusted via the adjustment nut 29 and/or the adjustable arm 21. The adjustment nut 29 is integrally formed with the backing 31 on the edge thereof. The adjustment nut 29 protrudes outward from the edge of the backing 31 and comprises a threaded interior 46 therein, wherein the threaded interior 46 may comprise a female type threaded element. The threaded interior 46 of the adjustment nut 29 is adapted to receive the second end 40 of the adjustable arm 21 therein. It is contemplated that the second end 40 of the adjustable arm 21 comprises a male type threaded elements 45 thereon so as to allow the mirror 33 to twist, pivot, or rotate with respect to the adjustable arm 21. The adjustment nut 29 can lock the mirror 33 into place at the desired angle after it is adjusted.

Additionally, the adjustable arm 21 can be bent in any direction to move the mirror 33. For example, the adjustable arm 21 can be bent to bring the mirror 33 closer to the user or extended into a straight configuration to move the mirror 33 further away from the user. The adjustable arm 21 can be bent by hand or with plyers. It is contemplated that the rigid nature of the arm 21 allows the arm 21 to be secured at a desired configuration when manipulated. Furthermore, the second end 40 of adjustable arm 21 can also be used for fine-tuning the angle of the mirror. The second end 40 primarily can be tilted upward or downward by hand or with plyers.

Figure 3:
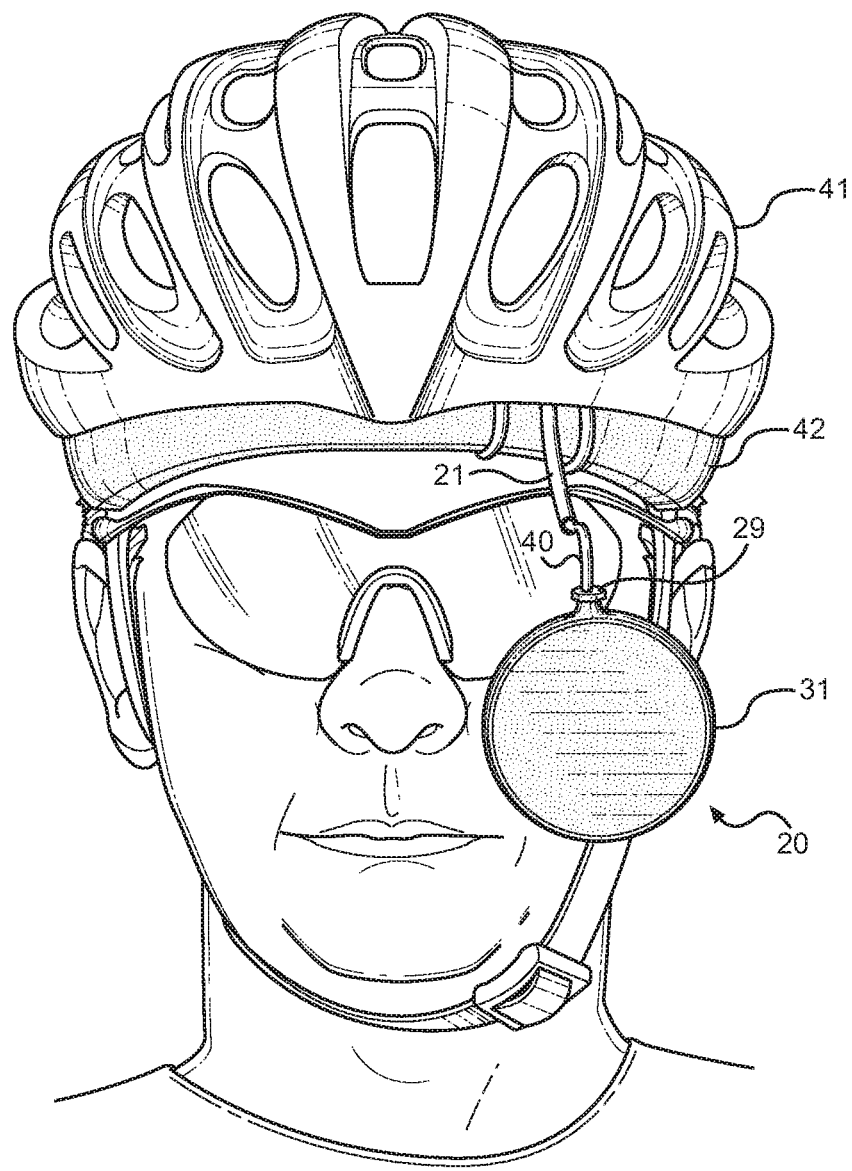
FIG. 3 shows a front view of the present invention as installed on a standard bicycle helmet.

Referring now to FIG. 3, there is a front view of the present invention as installed on a standard bicycle helmet. The bracket 34 is secured to the rim 42 of the helmet 41 at a front portion thereof, so that the adjustable arm 21 extends outward and the backing 31 of the mirror is in front of the user's face and offset to the side, near the user's eyes. As such, the terminal end 27 of the bracket 34 is tucked under the helmet 41 so that it extends towards the inner portion of the rim, and directly contacts the user's head. The helmet mirror 20 can be removably fastened onto many different types of helmets 41.

The bracket 34 is adapted to snugly fit around a portion of the rim of the helmet so that the mirror is prevented from vibrating or rattling while the user is riding a bicycle. Additionally, the bracket 34 comprises a loop that is separated by a defined space to provide a more securely mount the bracket 34 onto the helmet 41. In this way, the present invention 20 can provide a clearer view of the traffic approaching from behind, while keeping one's eyes forward.

It is contemplated that the mirror placement and angle can be adjusted in three manners: (1) adjustment nut 29 can be loosened to pivot the mirror left to right and thereafter tightened to lock it in place; (2) the second end 40 primarily used to affect the vertical tilt of the mirror; and (3) adjustable arm 21 can be used to move the mirror generally in all directions.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A helmet mirror, comprising:
an adjustable arm having a first end and a second end;
a bracket attached to said first end of said arm;
a mirror attached to said second end of said arm via an adjustment nut;
wherein the bracket comprises a unitary piece forming a curved loop configured to be removably attached to a rim of a protective helmet;
the bracket comprising an elongated and an enclosed loop including a connecting point, a terminal end, and a substantial midpoint therebetween;
said connecting point of said enclosed loop connected to said first end of said arm;
and said terminal end of said bracket adapted to extend towards an inner portion of said rim of said protective helmet.

2. The helmet mirror of claim 1, further comprising of a rubber coating on the said arm and said bracket.

3. The helmet mirror of claim 1, wherein said mirror comprises a layer of protective coating.

4. The helmet mirror of claim 1, wherein said mirror comprises a backing.

5. The helmet mirror of claim 4, wherein said backing comprises a recessed portion for holding said mirror therein.

6. The helmet mirror of claim 4, wherein said adjustment nut is integrally formed with said backing.

7. The helmet mirror of claim 1, wherein said adjustment nut comprises a threaded interior and said second end of said arm comprises a threaded element;
said threaded element of said second end of said arm adapted to engage said threaded interior of said adjustment nut, thereby allowing said mirror to pivot with respect to said arm.

8. The helmet mirror of claim 1, wherein said bracket comprises a J-shape.

9. The helmet mirror of claim 1, wherein said arm can be bent to affix said mirror in desirable location.

* * * * *